United States Patent
Park et al.

(10) Patent No.: US 7,596,325 B2
(45) Date of Patent: Sep. 29, 2009

(54) METHOD AND APPARATUS FOR PULSE-AMPLITUDE EQUALIZATION OF RATIONAL HARMONIC MODE-LOCKED OPTICAL SIGNAL

(75) Inventors: Chang Soo Park, Daejeon (KR); Yun Jong Kim, Seoul (KR); Chung Ghiu Lee, Chungcheongnam-do (KR)

(73) Assignee: Gwangju Institute of Science and Technology, Gwangju (KR)

( * ) Notice: Subject to any disclaimer, the term of this patent is extended or adjusted under 35 U.S.C. 154(b) by 565 days.

(21) Appl. No.: 11/024,824

(22) Filed: Dec. 30, 2004

(65) Prior Publication Data
US 2005/0259698 A1 Nov. 24, 2005

(30) Foreign Application Priority Data
May 24, 2004 (KR) .................. 10-2004-0036989

(51) Int. Cl.
*H04J 14/08* (2006.01)
*H04B 10/12* (2006.01)

(52) U.S. Cl. .................. 398/185; 398/186; 398/201; 398/195; 398/196; 398/197; 398/198; 398/188

(58) Field of Classification Search .............. 398/185, 398/186, 195–198, 201, 188
See application file for complete search history.

(56) References Cited

U.S. PATENT DOCUMENTS

| | | | | |
|---|---|---|---|---|
| 6,362,913 B2* | 3/2002 | Ooi et al. | ................ | 398/158 |
| 6,693,929 B1* | 2/2004 | Essiambre et al. | ............ | 372/26 |
| 6,728,019 B2* | 4/2004 | Usami et al. | ................ | 398/150 |
| 6,798,558 B2* | 9/2004 | Hayashi et al. | ............ | 359/279 |
| 6,850,713 B2* | 2/2005 | Kikuchi et al. | ............ | 398/201 |
| 6,957,019 B2* | 10/2005 | Gupta et al. | ................ | 398/95 |
| 6,959,152 B2* | 10/2005 | Fujiwara et al. | ............ | 398/81 |
| 7,027,468 B2* | 4/2006 | Krastev et al. | ............ | 372/6 |
| 7,035,486 B2* | 4/2006 | Griffin et al. | ................ | 385/3 |
| 7,116,917 B2* | 10/2006 | Miyamoto et al. | ......... | 398/185 |
| 7,174,103 B2* | 2/2007 | Nishiki et al. | ............ | 398/77 |
| 7,224,906 B2* | 5/2007 | Cho et al. | ................ | 398/183 |
| 7,340,114 B2* | 3/2008 | Doi et al. | ................ | 385/2 |
| 2003/0102938 A1* | 6/2003 | Erlig et al. | ................ | 333/156 |
| 2004/0086225 A1* | 5/2004 | Kim et al. | ................ | 385/31 |
| 2005/0259698 A1* | 11/2005 | Park et al. | ................ | 372/18 |
| 2006/0072924 A1* | 4/2006 | Lee et al. | ................ | 398/183 |

OTHER PUBLICATIONS

Yun Jung Kim et. al.; *Pulse-amplitude equalization in a rational harmonic mode-locked semiconductor fiber ring laser using a dual-drive Mach-Zehnder modulator*; Optics Express, Mar. 8, 2004, vol. 12, No. 5, pp. 907-915.

(Continued)

*Primary Examiner*—Ken N Vanderpuye
*Assistant Examiner*—Danny W Leung

(57) ABSTRACT

A method and an apparatus for pulse-amplitude equalization of rational harmonic mode-locked optical pulses provides modulation voltages greater than a switching voltage of a dual-electorde Mach-Zehnder modulator to electrodes of the Mach-Zehnder modulator, so that rational harmonic mode-locked optical pulses experience the same transmission coefficient through the Mach-Zehnder modulator, to thereby achieve amplitude-equalized rational harmonic mode-locked optical pulse trains.

20 Claims, 8 Drawing Sheets

OTHER PUBLICATIONS

Min-Yong Jeon et. al.; *Pulse-amplitude equalization output from a rational harmonic mode-locked fiber laser*; Optics Letters, Jun. 1, 1998, vol. 23, No. 11, pp. 855-857.

Hyuek Jae Lee et. al.; *Pulse-amplitude equalization of rational harmonic mode-locked fiber laser using a semiconductor optical amplifier loop mirror*; Optics Communications, Feb. 1, 1999, vol. 160, pp. 51-56.

Chung Ghiu Lee et. al.; *Pulse-amplitude equalization in a rational harmonic mode-locked semiconductor ring laser using optical feedback*; Optics Communication, Aug. 15, 2002, vol. 209, pp. 417-425.

Zhihong Li et. al.; *Theoretical and Experimental Study of Pulse-Amplitude-Equalization in a Rational Harmonic Mode-Locked Fiber Ring Laser*; IEEE Journal of Quantum Electronics, Jan. 2001, vol. 37, No. 1, pp. 33-37.

\* cited by examiner

METHOD AND APPARATUS FOR PULSE-AMPLITUDE EQUALIZATION OF RATIONAL HARMONIC MODE-LOCKED OPTICAL SIGNAL

FIELD OF THE INVENTION

The present invention relates to pulse-amplitude equalization in a rational harmonic mode-locked optical fiber ring laser; and, more particularly, to a method and an apparatus for equalizing amplitudes of rational harmonic mode-locked optical pulse train generated by the rational harmonic mode-locked optical fiber ring laser while allowing the optical pulse train to have a high repetition rate.

BACKGROUND OF THE INVENTION

Recently, an optical time division multiplexing (OTDM) optical communication system has been noticed as a communication technology with a high-speed and high-capacitance in a near future. Thus, a generation of stable pulse train with a high repetition rate has been on the rise as a significant technical issue in an ultrahigh speed OTDM optical communication.

An actively mode-locked fiber laser has been suggested as one of approaches to generate a short optical pulse train with a high repetition rate. Recently, there has been a research on a generation of optical pulse train with a higher repetition rate in a manner that a harmonic mode-locking is achieved by tuning a fundamental resonance frequency applied to a modulator by a rational of a laser resonance frequency. However, the optical pulse trains generated by the rational harmonic mode-locking have uneven pulse amplitudes in a third or more order rational harmonic mode-locking. Since such uneven pulse amplitudes deteriorate a system performance in an OTDM communication system, a problem of the uneven pulse amplitudes should be solved.

In order to solve the uneven pulse amplitudes, there have been reported several methods, including the use of another fiber laser with a nonlinear optical loop mirror mirror (NOLM), a semiconductor optical amplifier (SOA) loop mirror and an optical feedback, which are exemplarily is illustrated in FIGS. 1 to 3, respectively.

FIG. 1 shows a scheme using another fiber laser with a nonlinear optical loop mirror (NOLM). According to the scheme shown in FIG. 1, an output from a ring-typed Erbium-doped fiber laser (EDFL), i.e., the rational harmonic mode-locked optical pulse train having uneven amplitudes, is provided to another fiber laser with a nonlinear optical loop mirror (NOLM), and then undergoes the injection locking by such another fiber laser, thereby obtaining the amplitude-equalized rational harmonic mode-locked optical pulse (see, Min-Yong Jeon et al., "Pulse-amplitude-equalized output from a rational harmonic mode-locked fiber laser'" Opt. Lett., vol. 23, pp. 855-857, 1998).

FIG. 2 illustrates a scheme in which pulse-amplitude equalization is achieved by using a semiconductor optical amplifier (SOA) loop mirror as set forth above. In this scheme, the SOA loop mirror has a configuration of a terahertz optical asymmetric demultiplexing (TOAD) or that of a semiconductor laser amplifier in a loop mirror (SLALOM) When a large-amplitude optical pulses among amplitude-unequalized optical pulse train the loop mirror (SLALOM), the large-amplitude optical pulses is lowered to a specific level, so that the amplitude-unequalized optical pulse train can have an equalized amplitude (see, Hyuek Jae Lee et al., "Pulse-amplitude equalization of rational harmonic mode-locked fiber laser using a semiconductor optical amplifier loop mirror", Opt. Commun., vol 160, pp. 51-56, 1999.

Meanwhile, FIG. 3 depicts a scheme using the optical feedback, in which pulse-amplitude equalization is achieved in a rational harmonic mode-locked semiconductor ring laser by using a conventional optical feedback. In this scheme, an amplitude-equalized optical pulse train with a high repetition rate is achieved by appropriately delaying optical feedback signals of an amplitude-unequalized optical pulse train for a pulse intensity matching.

The aforementioned conventional pulse-amplitude equalization schemes have a drawback in that the schemes becomes complicated due to additional components added to a basic structure of the rational harmonic mode-locked fiber laser. Especially, whenever a separate component is added, an optical power loss occurs and, therefore, it is difficult to generate a stable optical pulse train with a high repetition rate.

SUMMARY OF THE INVENTION

It is, therefore, an object of the present invention to provide a method and an apparatus for equalizing amplitudes of rational harmonic mode-locked optical pulse train generated in a rational harmonic mode-locked semiconductor optical fiber laser while allowing the optical pulse train to have a high repetition rate.

In accordance with one aspect of the present invention, there is provided an apparatus for pulse-amplitude equalization in rational harmonic mode-locked optical pulses, the apparatus comprising:

a rational harmonic mode-locked optical fiber ring laser having a modulator for producing the rational harmonic mode-locked optical pulses by using a switching voltage applied thereto; and a modulation signal generator for providing RF signals of modulation voltages greater than the switching voltage to the modulator, so that the rational harmonic mode-locked optical pulses experience the same transmission coefficient through the modulator, to thereby achieve an amplitude-equalized rational harmonic mode-locked optical pulse train.

In accordance with another aspect of the present invention, there is provided a method of equalizing amplitudes of rational harmonic mode-locked optical pulses generated in the rational harmonic mode-locked optical fiber ring laser having a dual-electrode Mach-Zehnder modulator, the method comprising the steps of:

providing modulation voltages of RF signals to electrodes of the Mach-Zehnder modulator, respectively; and controlling the modulation voltages of the RF modulation signals applied to the electrodes of the Mach-Zehnder modulator so that the rational harmonic mode-locked optical pulses experience the same transmission coefficient through the Mach-Zehnder modulator, to thereby achieve amplitude-equalized rational harmonic mode-locked optical pulse trains.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

A preferred embodiment of the apparatus and method for a pulse-amplitude equalization of rational harmonic mode-locked optical pulse trains generated in a rational harmonic mode-locked optical fiber laser in accordance with the present invention will be described in detail with reference to the accompanying drawings.

Figure 1:
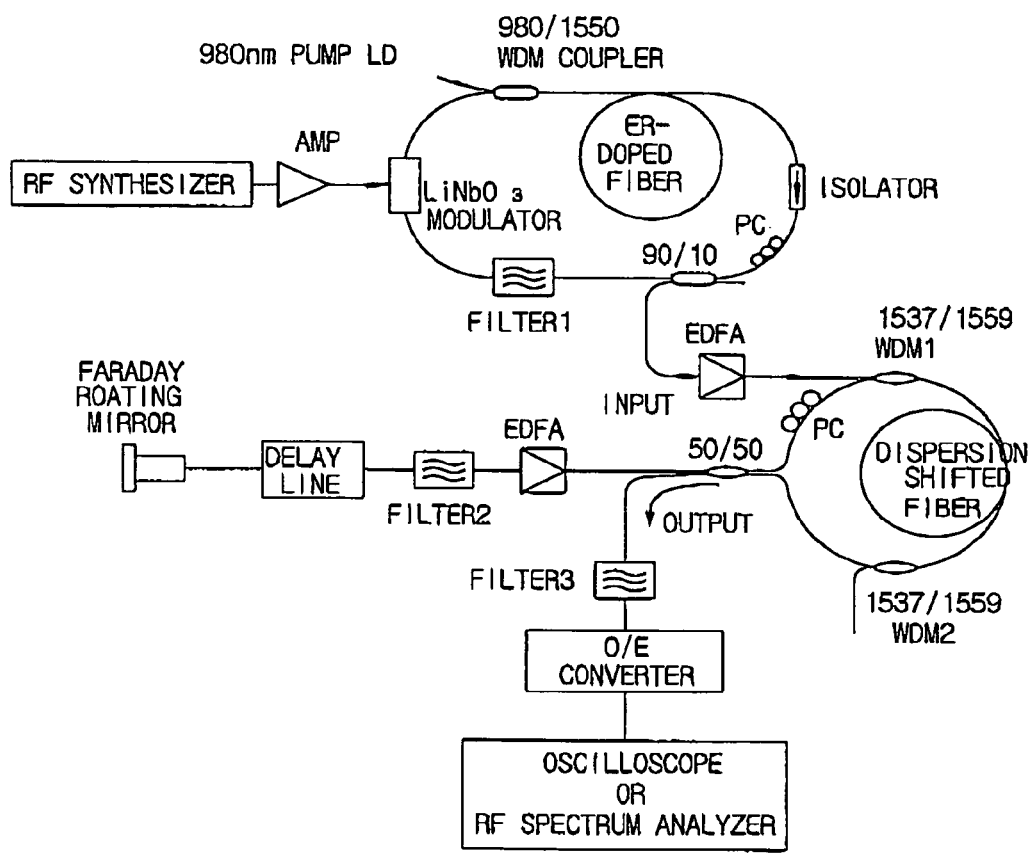
FIG. 1 shows a prior art for an optical pulse-amplitude equalization using a nonlinear optical fiber loop mirror.
Figure 2:
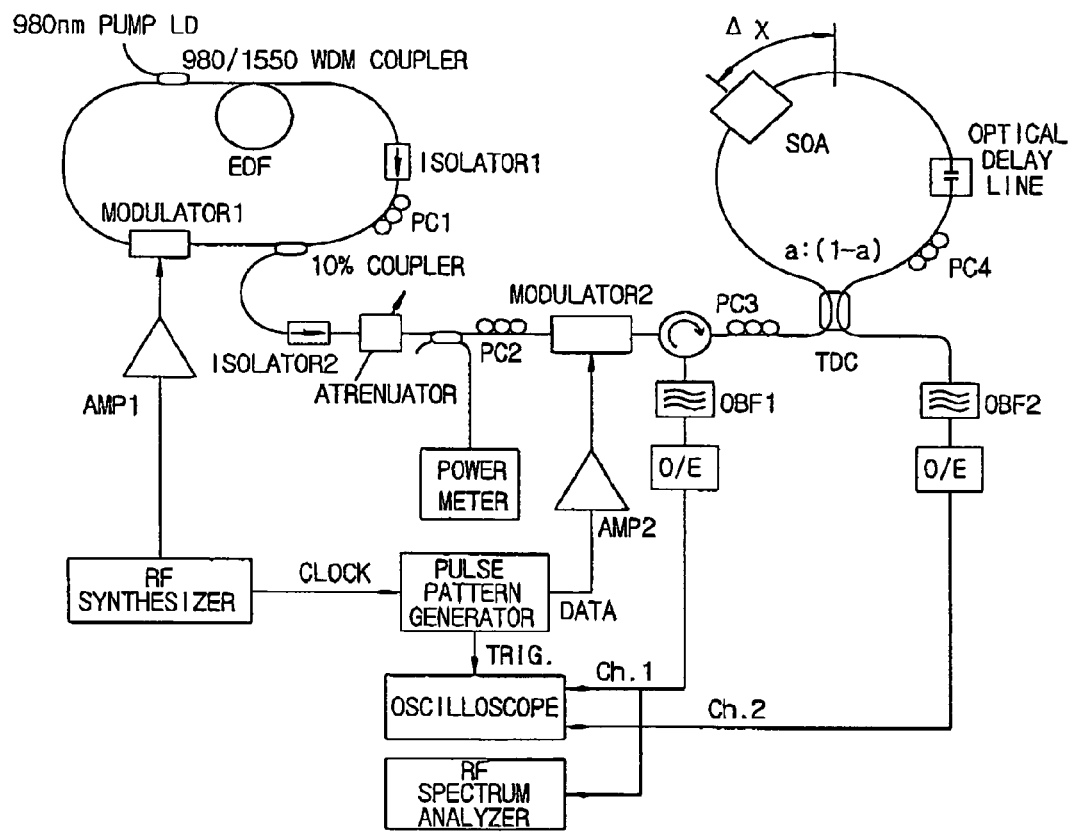
FIG. 2 describes a prior art for an optical pulse-amplitude equalization using a semiconductor optical amplifier loop mirror.
Figure 3:
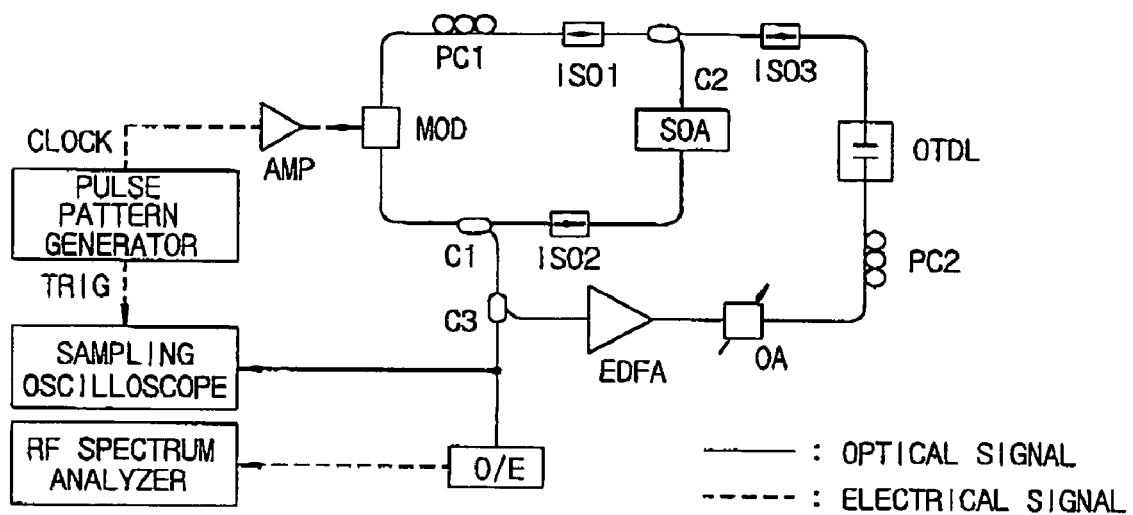
FIG. 3 provides a prior art for an optical pulse-amplitude equalization using an optical feedback.
Figure 4:
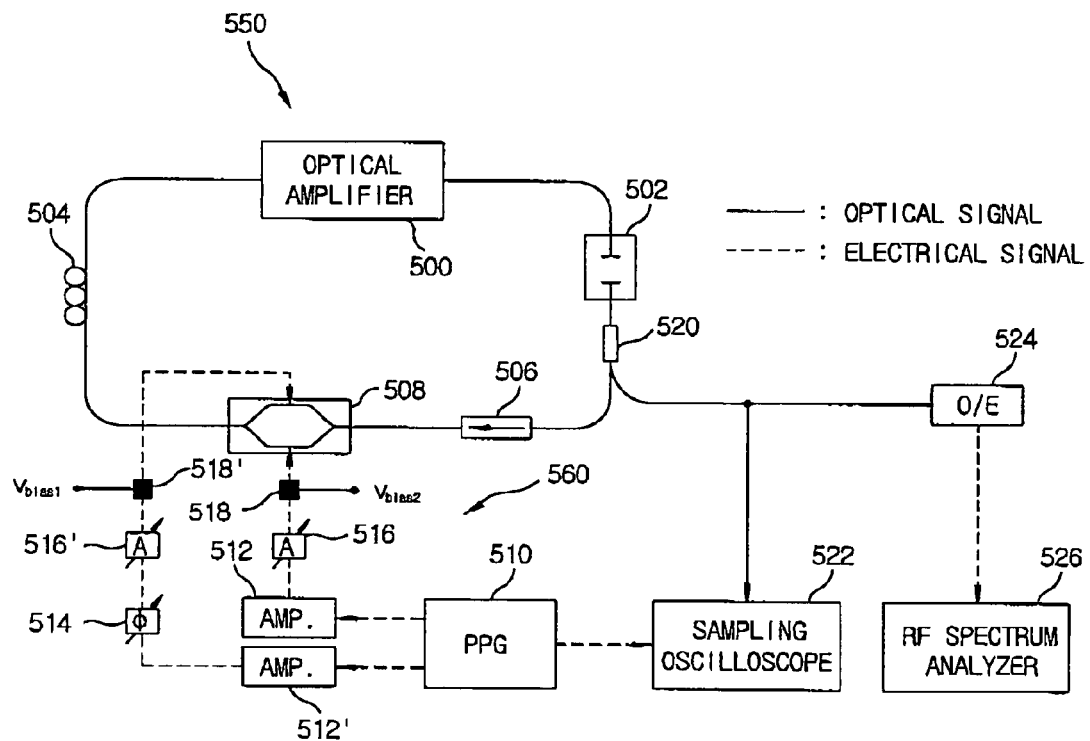
FIG. 4 illustrates an apparatus for a pulse-amplitude equalization of a rational harmonic mode-locked optical pulse train in accordance with a preferred embodiment of the present invention.

FIG. 4 shows a schematic diagram of an apparatus for a pulse-amplitude equalization of rational harmonic mode-locked optical pulse trains generated in a rational harmonic mode-locked optical fiber laser in accordance with a preferred embodiment of the present invention.

As shown in FIG. 4, the apparatus for a pulse-amplitude equalization of rational harmonic mode-locked optical pulse trains in accordance with the present invention includes a rational harmonic mode-locked fiber ring laser 550 and a modulation signal generating module 560 for supplying modulation voltages to the rational harmonic mode-locked fiber ring laser 550. The rational harmonic mode-locked fiber ring laser 550 includes an optical amplifier 500, an optical signal time delay line 502, a polarization controller 504, an optical isolator 506 and a modulator 508.

The optical amplifier 500 amplifies rational harmonic mode-locked optical pulses generated in the rational harmonic mode-locked fiber ring laser 550. Such optical amplifier 500 includes a semiconductor optical amplifier (SOA) or an Erbium-doped optical fiber amplifier. The rational harmonic mode-locked fiber ring laser 550 using the semiconductor optical amplifier as a gain medium is less sensitive to the surroundings in comparison with that of using the Erbium-doped optical fiber amplifier.

The optical signal time delay line 502 synchronizes by using a time delay the optical pulses amplified by the optical amplifier 500, and the polarization controller 504 controls polarization states of the optical pulses. The optical isolator 506 enables an one-way flow of the optical pulses by preventing the optical pulses from flowing backward in the rational harmonic mode-locked fiber ring laser 550.

The modulator 508 includes a dual-electrode Mach-Zehnder modulator having transmission characteristics that are determined by a correlation between voltages applied to both electrodes thereof. Thus, if the voltages to be applied to the electrodes of the Mach-Zehnder modulator 508 are adjusted to control the transmission characteristics, amplitude-unequalized rational harmonic mode-locked optical pulses experience the same transmission coefficient in the dual-electrode Mach-Zehnder modulator 508, thereby enabling to achieve an amplitude-equalized optical pulse train with a high repetition rate. The relationship between the pulse amplitude and the transmission characteristics of the Mach-Zehnder modulator 508 and will be described in detail with reference to FIGS. 5 to 7.

In the meantime, the modulation signal generating module 560 includes a pulse pattern generator or a PPG 510; RF amplifier 512 and 512'; an RF phase shifter 514; RF attenuators 516 and 516'; and bias circuits 518 and 518'.

The pulse pattern generator 510 generates RF clock signals with same modulation amplitude and same frequency or same modulation amplitude but difference frequencies with each other. The RF clock signals are provided to the amplifiers 512 and 512' for amplifying them, respectively. The amplified RF signal by the amplifier 512 is provided to the attenuator 516, while the amplified RF signal by the amplifier 512' is provided to the attenuator 516' via the phase shifter 514. The phase shifter 514 performs a phase shift by n on the amplified RF signal from the amplifier 512'. Therefore, the RF signals represent amplitudes of modulation voltages $v_{ac}(t)$ and $\overline{v_{ac}(t)}$ with a phase difference of n with each other. In the attenuators 516 and 516', the voltages $v_{ac}(t)$ and $\overline{v_{ac}(t)}$ are adjusted to have appropriate levels to drive the Mach-Zehnder modulator 508. The modulation voltages adjusted by the attenuators 516 and 516' are provided to the bias circuits 518 and 518', respectively. The bias circuits 518 and 518' serves to bias DC bias voltages $V_{bias1}$ and $V_{bias2}$, which are individually adjustable, to the modulation voltages, to thereby produce RF modulation signals of modulation voltages $V_1(t)$ and $V_2(t)$ which are controlled by the bias voltages $V_{bias1}$ and $V_{bias2}$, respectively. The RF signals of the modulation voltages $V_1(t)$ and $V_2(t)$ are provided to the electrodes of the Mach-Zehnder modulator 508, respectively. The modulation voltages $V_1(t)$ and $V_2(t)$ to be provided to the electrodes of the Mach-Zehnder modulator 508 are represented as follows, respectively.

$$V_1(t) = V_{bias1} + |V_{ac}|\sin(2\pi f_{mod}t + \Phi_1)$$

$$V_2(t) = V_{bias2} + |V_{ac}|\sin(2\pi f_{mod}t + \Phi_2)$$

where $V_1(t)$ and $V_2(t)$ represent the modulation voltages applied to the electrode of the Mach-Zehnder modulator; $V_{ac}$ represents the amplitude of the modulation voltages; $V_{bias1}$ and $V_{bias2}$ denote the bias voltages; $f_{mod}$ denotes the modulation frequency; and $\phi_1$ and $\phi_2$ denote the phases of the modulation voltages, respectively.

Once and again, the RF signals of the modulation voltages are adjusted by the attenuators 516 and 516' and the bias circuits 518 and 518' before being applied to the electrodes of the Mach-Zehnder modulator 508.

In accordance with the present invention, the modulation voltage $V_1(t)$ and $V_2(t)$ to be provided to the Mach-Zehnder modulator 508 axe controlled by the bias voltages to be higher than the switching voltage of the Mach-Zehnder modulator 508. By applying the voltages of the RF modulation signals higher than the switching voltage to the electrodes of the Mach-Zehnder modulator 508, the rational harmonic mode-locked pulses experience almost the same transmission coefficient through the Mach-Zehnder modulator 508. As a result, it is possible to obtain the amplitude-equalized rational harmonic mode-locked pulse train. In this case, the RF modulation signals have the same amplitude and frequency, the same amplitude but different frequencies from each other, different amplitude but same frequency, or different amplitude and frequency from each other. Alternatively, by applying one of the modulation voltages only to anyone of electrodes in the Mach-Zehnder modulator 508, an amplitude-equalized rational harmonic mode-locked pulse train can also be obtained. In this case, however, a degree of freedom may sharply deteriorate.

The optical signal of the rational harmonic mode-locked pulse train achieved in the Mach-Zehnder modulator 508 was measured by a 3 dB optical coupler 520. Further, the optical signal measured by the optical coupler 502 was analyzed through the use of a sampling oscilloscope 522 that was triggered at the time when the RF clock signals were generated from the pulse pattern generator 510 and an RF spectrum analyzer 526 via an optical-electrical converter 524.

In the rational harmonic mode-locked fiber ring laser 550 configured as in FIG. 4, if an RF modulation frequency $f_{mod}$ is equal to an integer multiple of a fundamental cavity frequency $f_{cav}$, that is, $f_{mod}=nf_{cav}$ (n is a positive integer), harmonic mode-locking pulses occur, and a pulse repetition rate $f_{rep}$ of the harmonic mode-locked pulses is the same as the RF modulation frequency $f_{mod}$, that is, $f_{rep}=f_{mod}$.

To achieve a rational harmonic mode-locked optical pulse train, the modulation frequency $f_{mod}$ is slightly detuned from a harmonic mode-locking condition by $f_{cav}/p$ (p is an order of the rational harmonic mode-locked pulses). That is, if p is a positive integer, an equation, i.e., $f_{mod}=nf_{cav}+f_{cav}/p$, is satisfied.

The amplitudes of the pth-order rational harmonic mode-locked optical pulses generated based on such relationship are determined by transmission coefficients through the Mach-Zehnder modulator 508. The transmission characteristics of the Mach-Zehnder modulator 508 are controlled by the voltages applied to the electrodes of the Mach-Zehnder modulator 508.

In case where p is assumed to be 3 in the present invention, the modulation frequency is obtained at 2.48832 GHz and detuned from 2.48832 GHz to 2.49084 GHz by $f_{cav}/3$.

Figure 5:
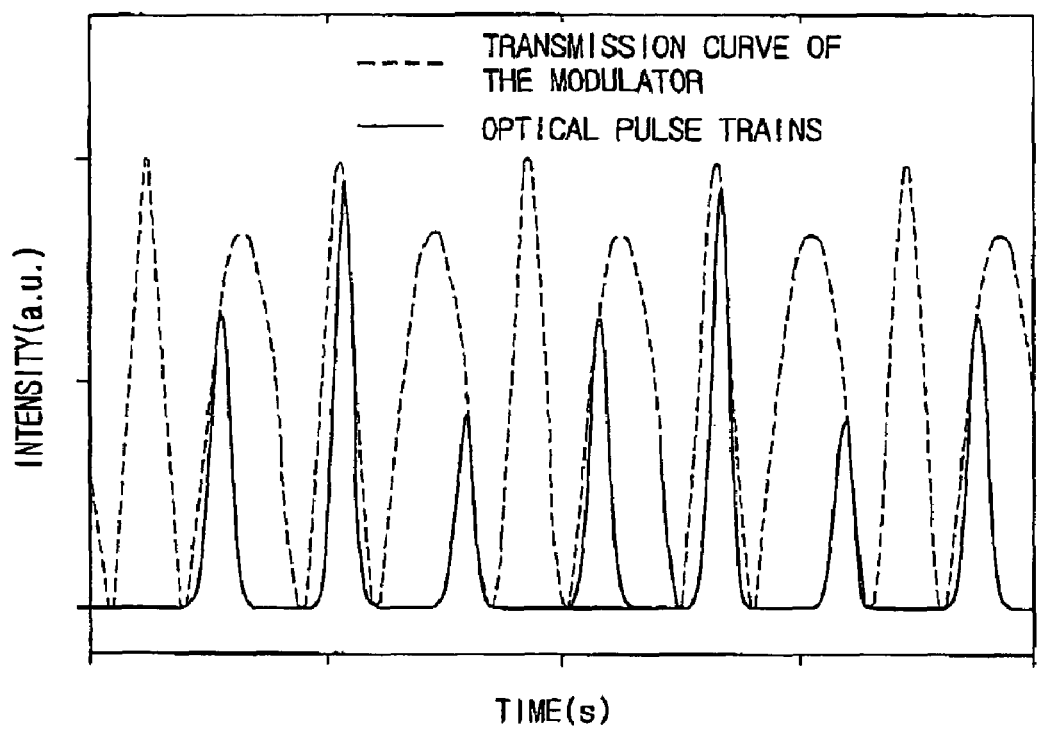
FIG. 5 offers a waveform chart depicting a transmission curve (dotted line) and output optical pulse trains (solid line) of a modulator for a third order rational harmonic mode-locking, which is seen in case where an amplitude equalization do not achieved by driving the modulator at voltages lower than a switching voltage thereof.

FIG. 5 offers a waveform chart depicting a relationship between a transmission curve (dotted line) of the Mach-Zehnder modulator 508 and $p^{th}$-order rational harmonic mode-locked optical pulse trains (solid line), which is shown in case where the modulation amplitude $V_{ac}$ of the RF modulation signals applied to both electrodes of the modulator 508 are smaller than that of switching voltage $V_\pi$ to the modulator 508. In such case, as shown in FIG. 5, the $p^{th}$-order rational harmonic mode-locked optical pulses are matched with different characteristics of the transmission curve of the Mach-Zehnder modulator 508 and, thus, have uneven pulse amplitudes. It is because the rational harmonic mode-locked pulses experience different transmission coefficients in the Mach-Zehnder modulator 508.

Figure 6:
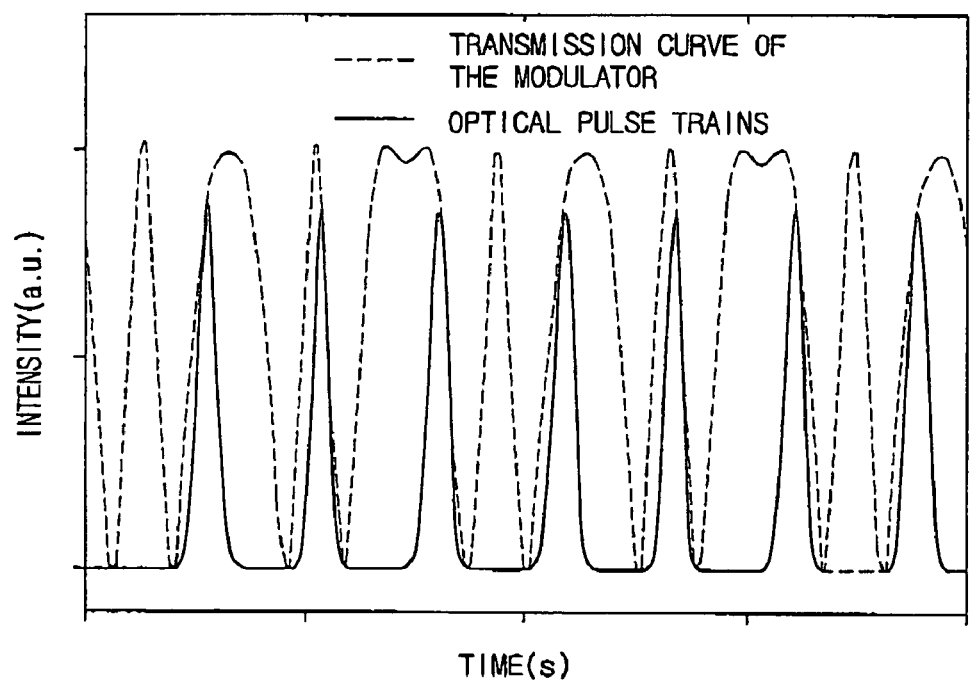
FIG. 6 presents a waveform chart showing a transmission curve (dotted line) and output optical pulse trains (solid line) of a modulator for a third order rational harmonic mode-locking, which is seen in case where an amplitude equalization is achieved by driving the modulator at voltages higher than a switching voltage thereof in accordance with the present invention.

FIG. 6 represents a transmission curve (dotted line) and optical pulse trains (solid line) observed in case where the modulation amplitude of the voltages to the Mach-Zehnder modulator 508 is greater than that of the switching voltage of the Mach-Zehnder modulator 508. The transmission curve shown in FIG. 6 has more maximum and minimum values in comparison with that shown in FIG. 5, since the $p^{th}$-order rational harmonic mode-locked optical pulse experiences almost the same transmission coefficient through the modulator 508 and, then, has equalized pulse amplitudes. In this regard, it is also possible to obtain the amplitude-equalized $p^{th}$-order rational harmonic mode-locked optical pulse by operating the Mach-Zehnder modulator 508 in a manner that one of the voltages is applied to only one electrode of the Mach-Zehnder modulator 508 instead of both electrodes thereof.

Figure 7:
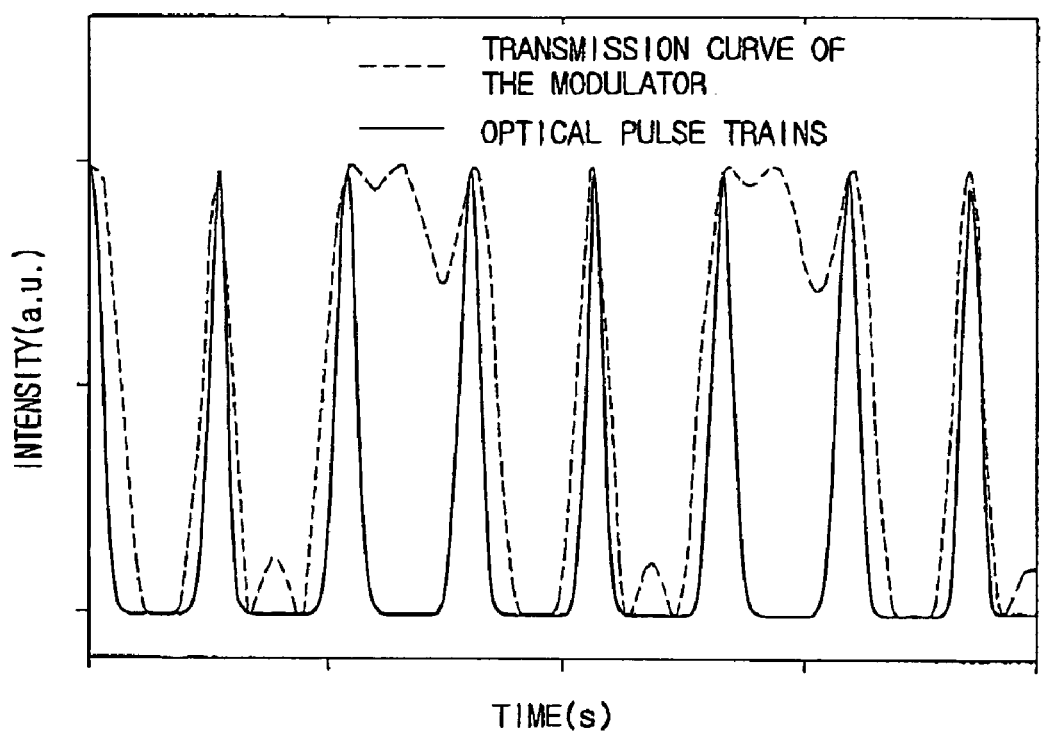
FIG. 7 describing a waveform chart illustrating a transmission curve (dotted line) and output optical pulse trains (solid line) of a modulator, which is seen in case where an amplitude equalization is achieved by driving the modulator at RF modulation signals having different frequencies in accordance with the present invention.

FIG. 7 represents a relationship between a transmission curve (dotted line) and optical pulse trains (solid line), which is shown in case where the RF modulation signals having different frequencies are applied to both electrodes of the Mach-Zehnder modulator 508. In this case, the RF modulation signals do not have a shape of a simple sine curve and further. Even if the modulation amplitude of the RF modulation signals is lower than that of the switching voltage, the amplitude-equalized rational harmonic mode-locked optical pulse can be obtained as shown in FIG. 7.

Figure 8:
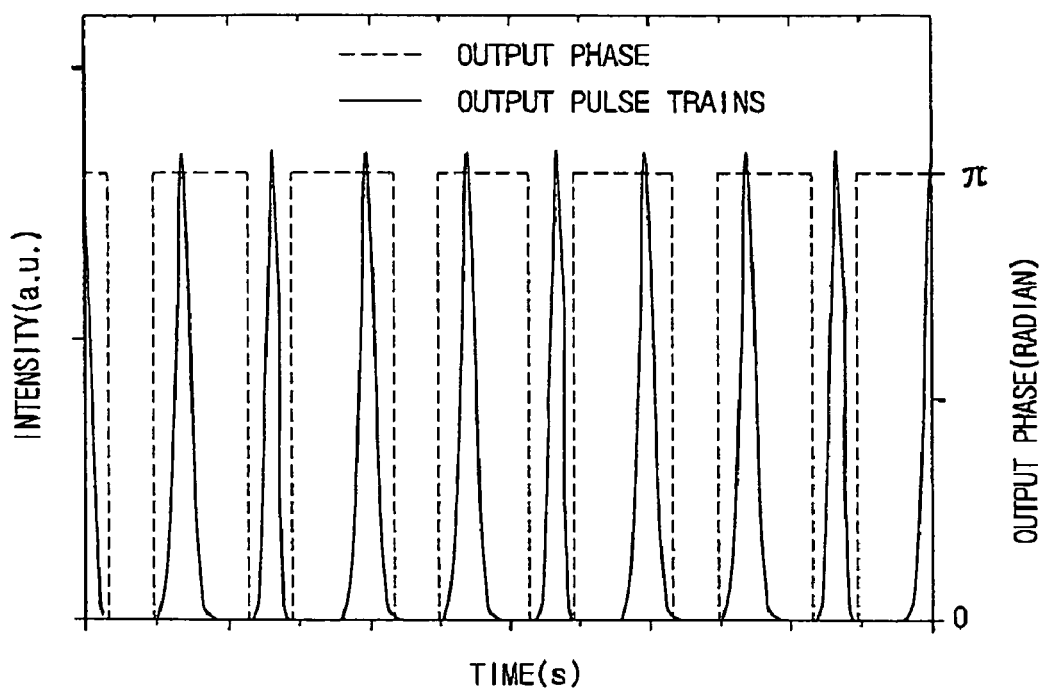
FIG. 8 illustrates a waveform chart representing amplitude equalized optical pulse trains (dotted line) obtained in accordance with the present invention and different phases (solid line) between adjacent pulses thereof.

FIG. 8 illustrates output phases (solid line) of amplitude-equalized rational harmonic mode-locked optical pulse trains. The amplitude-equalized optical pulse trains have different phases between adjacent pulses depending on the amplitude and the bias voltages of the RF modulation signals applied to the Mach-Zehnder modulator 508, and a phase difference between the RF clock signals.

As described above, in accordance with the present invention, since the amplitude equalization is achieved only by adjusting transmission characteristics of a modulator, there is no need to change the basic scheme of a rational harmonic mode-locked fiber laser without requiring additional components, thereby enabling a cost reduction. Further, an optical power loss caused whenever an additional component is added can be reduced, so that stable optical pulse train with a high repetition rate can be easily achieved. Such stable optical pulse train with a high repetition rate has different phases between adjacent pulses, and therefore, propagation characteristics are improved in comparison with optical pulse train having the same phase. Accordingly, the amplitude-equalized rational harmonic mode-locked optical pulse train can be widely utilized as a stable optical signal source with a high repetition rate as required in an ultrahigh speed OTDM optical communication system.

While the invention has been shown and described with respect to the preferred embodiments, it will be understood by those skilled in the art that various changes and modification may be made without departing from the spirit and scope of the invention as defined in the following claims.

What is claimed is:

1. An apparatus for pulse-amplitude equalization of rational harmonic mode-locked optical pulses, the apparatus comprising:
   a rational harmonic mode-locked optical fiber ring laser for producing rational harmonic mode-locked optical pulses, the rational harmonic mode-locked optical fiber ring laser having a Mach-Zehnder modulator including first and second electrodes configured to receive first and second modulation voltages, respectively; and
   a modulation signal generator for providing the first and second modulation voltages to the first and second electrodes of the Mach-Zehnder modulator, wherein the modulation signal generator includes:
      a pulse pattern generator to generate first and second RF signals,
      a first amplifier to receive and amplify the first RF signal,
      a phase shifter to receive the first RF signal amplified by the first amplifier and phase shift the first RF signal, a first attenuator to receive and attenuate the first RF signal that has been phase shifted by the phase shifter, a first bias circuit to receive the first RF signal that has been attenuated by the first attenuator and generate the first modulation voltage by applying a first bias voltage to the first RF signal, second amplifier to receive and amplify the second RF signal, a second attenuator to receive and attenuate the second RF signal, a second bias circuit to receive the second RF signal that has been attenuated by the second attenuator and generate the second modulation voltage by applying a second bias voltage to the second RF signal, wherein a potential difference between the first and second modulation voltages applied to the first and second electrodes of the Mach-Zehnder modulator is greater than a switching voltage of the Mach-Zehnder modulator, so that the Mach-Zehnder modulator can be operated to apply the same transmission coefficient to the rational harmonic mode-locked optical pulses and provide an amplitude equalized rational harmonic mode-locked optical pulse train.

2. The apparatus according to claim 1, wherein the first and second modulation voltages applied to the first and second electrodes of the Mach-Zehnder modulator have the same frequency and amplitude, wherein the first and second bias circuits are used to control transmission characteristics of the Mach-Zehnder modulator by controlling the first and second modulation voltages being applied to the first and second electrodes of the Mach-Zehnder modulator.

3. The apparatus according to claim 2, wherein the amplitude-equalized rational harmonic mode-locked optical pulse train have different phases between adjacent pulses.

4. The apparatus according to claim 2, wherein the first and second modulation voltages have a phase difference of 180 degrees from each other.

5. The apparatus according to claim 1, wherein the first and second modulation voltages applied to the first and second electrodes of the Mach-Zehnder modulator have different frequencies from each other and the same amplitude.

6. The apparatus according to claim 5, wherein the amplitude-equalized rational harmonic mode-locked optical pulse trains have different phases between adjacent pulses.

7. The apparatus according to claim 1, wherein the rational harmonic mode-locked optical fiber ring laser further includes:

an optical amplifier configured for use as a gain medium in the rational harmonic mode-locked optical fiber ring laser;

an optical signal time delay line for synchronizing rational harmonic mode-locked optical pulses by a time delay;

a polarization controller for controlling polarization states of the rational harmonic mode-locked optical pulses in a resonance loop; and an optical isolator for preventing the rational harmonic mode-locked optical pulses in the rational harmonic mode-locked optical fiber ring laser from flowing backward.

8. The apparatus according to claim 7, wherein the optical amplifier includes a semiconductor optical amplifier.

9. The apparatus according to claim 7, wherein the optical amplifier includes an optical fiber amplifier.

10. A method of equalizing amplitudes of rational harmonic mode-locked optical pulses generated in the rational harmonic mode-locked optical fiber ring laser having a Mach-Zehnder modulator, the method comprising:

providing first and second RF signals, respectively, to first and second amplifiers to amplify the first and second RF signals;

phase shifting the first RF signal amplified by the first amplifier using a phase shifter;

applying a first bias voltage to the first RF signal that has been phase shifted to generate a first modulation voltage;

providing the first modulation voltage to a first electrode of the Mach-Zehnder modulator;

applying a second bias voltage to the second RF signal to generate a second modulation voltage; and providing the second modulation voltage to a second electrode of the Mach-Zehnder modulator, wherein a potential difference between the first and second modulation voltages is greater than a switching voltage of the Mach-Zehnder modulator, so that the Mach-Zehnder modulator can be operated to provide an amplitude equalized rational harmonic mode-locked optical pulse train.

11. The method according to claim 10, wherein the first and second modulation voltages have different phases from each other, and the Mach-Zehnder modulator is operated to provide the amplitude equalized rational harmonic mode-locked optical pulse train by applying the same transmission coefficient to the rational harmonic mode-locked optical pulses.

12. The method according to claim 10, wherein the first and second modulation voltages have the same frequency and amplitude.

13. The method according to claim 10, wherein the first and second modulation voltages have different frequencies from each other and the same amplitude.

14. The method according to claim 11, wherein the first and second modulation voltages have different amplitude from each other.

15. The method according to claim 12, wherein the amplitude-equalized rational harmonic mode-locked optical pulse train has different pulses between adjacent pulses.

16. The method according to claim 13, wherein the amplitude-equalized rational harmonic mode-locked optical pulse train has different phases between adjacent pulses.

17. The method according to claim 14, wherein the amplitude-equalized rational harmonic mode-locked optical pulse train has different phases between adjacent pulses.

18. An apparatus for pulse-amplitude equalization of rational harmonic mode-locked optical pulses, the apparatus comprising:

a rational harmonic mode-locked optical fiber ring laser for producing rational harmonic mode-locked optical pulses, the rational harmonic mode-locked optical fiber ring laser having a Mach-Zehnder modulator including first and second electrodes configured to receive first and second modulation voltages, respectively; and a modulation signal generator for providing the first and second modulation voltages to the first and second electrodes of the Mach-Zehnder modulator, wherein the modulation signal generator includes:

a pulse pattern generator to generate first and second RF signals, a first bias circuit configured to provide a first bias voltage to the first RF signal and generate the first modulation voltage, so that the first modulation voltage can be applied to the first electrode of the Mach-Zehnder modulator, a second bias circuit configured to provide a second bias voltage to the second RF signal and generate the second modulation voltage, so that the second modulation voltage can be applied to the second electrode of the Mach-Zehnder modulator, wherein a potential difference between the first and second modulation voltages is greater than a switching voltage of the Mach-Zehnder modulator, so that the Mach-Zehnder modulator can be operated to provide an amplitude equalized rational harmonic mode-locked optical pulse train.

19. The apparatus of claim 18, wherein the first and second modulation voltages have different phases from each other, and the Mach-Zehnder modulator is operated to provide the amplitude equalized rational harmonic mode-locked optical pulse train by applying the same transmission coefficient to the rational harmonic mode-locked optical pulses.

20. The apparatus of claim 18, the modulation signal generator further includes:

a first amplifier to receive and amplify the first RF signal generated by the pulse pattern generator;

a phase shifter to receive the first RF signal amplified by the first amplifier and phase shift the first RF signal;

a first attenuator to receive and adjust an amplitude of the first RF signal that has been phase shifted by the phase shifter;

a second amplifier to receive and amplify the second RF signal generated by the pulse pattern generator; and a second attenuator to receive and adjust an amplitude of the second RF signal amplified by the second amplifier, wherein the first bias circuit receives the first RF signal after the first RF signal has been processed by the first attenuator, and wherein the second bias circuit receives the second RF signal after the second RF signal has been processed by the second attenuator.

* * * * *